(12) United States Patent
Hill

(10) Patent No.: US 7,069,688 B2
(45) Date of Patent: Jul. 4, 2006

(54) ANIMAL TRAP

(75) Inventor: Daniel J. Hill, 11493 Claridon Troy Rd., Chardon, OH (US) 44024

(73) Assignee: Daniel J. Hill, Chardon, OH (US)

( * ) Notice: Subject to any disclaimer, the term of this patent is extended or adjusted under 35 U.S.C. 154(b) by 0 days.

(21) Appl. No.: 10/811,652

(22) Filed: Mar. 29, 2004

(65) Prior Publication Data

US 2004/0216365 A1 Nov. 4, 2004

Related U.S. Application Data

(60) Provisional application No. 60/461,315, filed on Apr. 8, 2003.

(51) Int. Cl.
*A01M 23/30* (2006.01)
*A01M 23/24* (2006.01)

(52) U.S. Cl. .................................. 43/81; 43/80; 43/85

(58) Field of Classification Search .............. 43/77–82, 43/85, 58
See application file for complete search history.

(56) References Cited

U.S. PATENT DOCUMENTS

| 599,407 | A | * | 2/1898 | Sullivan | 43/85 |
|---|---|---|---|---|---|
| 674,669 | A | * | 5/1901 | Botsford | 43/81 |
| 714,281 | A | * | 11/1902 | Chasse | 43/85 |
| 718,853 | A | * | 1/1903 | Merritt | 43/81 |
| 744,029 | A | * | 11/1903 | Birdsall | 43/81 |
| 774,628 | A | * | 11/1904 | Wilkinson | 43/82 |
| 873,631 | A | * | 12/1907 | Sullivan | 43/85 |
| 882,755 | A | | 3/1908 | Hamilton | |
| 998,047 | A | * | 12/1911 | Stilson | 43/81 |
| 1,026,305 | A | * | 5/1912 | Eldridge et al. | 43/79 |
| 1,091,926 | A | * | 3/1914 | Gates | 43/81 |
| 1,366,282 | A | * | 1/1921 | Ropp | 43/61 |
| 1,535,001 | A | * | 4/1925 | Weisenburger et al. | 43/85 |
| 1,799,149 | A | * | 4/1931 | Burnley | 43/81 |
| 1,877,979 | A | * | 9/1932 | Savage | 43/131 |
| 1,992,353 | A | * | 2/1935 | Cattanach | 43/81 |
| 2,257,246 | A | * | 9/1941 | Rudolph | 43/81 |

(Continued)

FOREIGN PATENT DOCUMENTS

CA 694163 B1 * 9/1964 .................. 43/81

(Continued)

OTHER PUBLICATIONS

Suzanne Hively, *To Arms for War Against the Mole Tiny Tunnelers can Wreak Havoc in Gardens,* The Plain Dealer, Sep. 5, 1999, at 1-G.

*Primary Examiner*—Darren W. Ark
(74) *Attorney, Agent, or Firm*—Fay, Sharpe, Fagan, Minnich & McKee, LLP

(57) ABSTRACT

An animal trap includes a frame, a striker, a biasing member, a set lever and a trigger. The frame includes an upper wall, a first side member depending from the upper wall and a second side member spaced from the first side member and depending from the upper wall. The striker mounts to at least one of the upper wall, the first side member and the second side member. The biasing member biases the striker away from the upper wall toward a direction that the side members depend from the upper wall. The set lever retains the striker toward the upper wall. The trigger operatively connects to the striker via the set lever. Movement of the trigger a predetermined distance results in movement of the trigger.

17 Claims, 3 Drawing Sheets

U.S. PATENT DOCUMENTS

| | | | |
|---|---|---|---|
| 2,475,467 A * | 7/1949 | Alvan | 43/80 |
| 2,492,957 A * | 1/1950 | Blair | 43/81 |
| 2,510,655 A * | 6/1950 | Price et al. | 43/77 |
| 2,534,358 A * | 12/1950 | Lehn | 43/85 |
| 2,669,056 A * | 2/1954 | Lehman | 43/79 |
| 2,683,951 A * | 7/1954 | Hamaker | 43/80 |
| 2,809,464 A * | 10/1957 | Sutton | 43/80 |
| 4,109,406 A | 8/1978 | Denninger | |
| 4,158,929 A * | 6/1979 | Custard | 43/82 |
| 4,179,836 A * | 12/1979 | Clark | 43/77 |
| 4,213,265 A | 7/1980 | Denninger et al. | |
| D270,174 S | 8/1983 | Gaines | |
| 4,425,732 A * | 1/1984 | Kania | 43/81 |
| 4,462,182 A | 7/1984 | French | |
| 4,494,335 A | 1/1985 | Gaines | |
| 4,578,893 A * | 4/1986 | Wickenberg | 43/81 |
| 4,633,610 A * | 1/1987 | Thompson | 43/85 |
| 4,640,043 A | 2/1987 | Sigler | |
| 4,665,644 A * | 5/1987 | Vajs et al. | 43/82 |
| 4,711,049 A * | 12/1987 | Kness | 43/81 |
| 4,765,087 A | 8/1988 | Holtgrefe, Sr. | |
| 4,776,128 A | 10/1988 | Townsend | |
| 4,790,102 A | 12/1988 | McPherson | |
| 4,803,799 A * | 2/1989 | Vajs et al. | 43/82 |
| 4,827,662 A | 5/1989 | Dahlman | |
| 4,852,294 A * | 8/1989 | Langli | 43/81 |
| 5,307,587 A | 5/1994 | Zeiger et al. | |
| 5,339,846 A | 8/1994 | Shelton et al. | |
| 5,410,837 A | 5/1995 | Kazzyk | |
| 5,590,487 A * | 1/1997 | Hovden | 43/81 |
| 5,950,354 A * | 9/1999 | Carnwath | 43/81 |
| 5,960,583 A * | 10/1999 | Hansson | 43/81 |
| 5,987,811 A * | 11/1999 | Wiesener et al. | 43/58 |
| 6,029,392 A | 2/2000 | Relf | |
| 6,101,761 A | 8/2000 | Sprick | |
| D441,828 S * | 5/2001 | Leyerle et al. | D22/119 |
| 6,266,917 B1 * | 7/2001 | Hight | 43/81 |
| 6,389,738 B1 * | 5/2002 | Denny et al. | 43/58 |
| 6,397,517 B1 * | 6/2002 | Leyerle et al. | 43/58 |
| 6,415,544 B1 * | 7/2002 | Leyerle et al. | 43/82 |
| 6,874,274 B1 * | 4/2005 | Townsend | 43/81 |
| 2003/0115790 A1 * | 6/2003 | Domigan et al. | 43/77 |

FOREIGN PATENT DOCUMENTS

| | | | | |
|---|---|---|---|---|
| CA | 2360869 A1 * | 2/2003 | | |
| DE | 100857 A1 * | 1/1899 | | 43/81 |
| DE | 147514 A1 * | 12/1902 | | 43/81 |
| EP | 954964 A1 * | 11/1999 | | |
| FR | 2583617 A1 * | 12/1986 | | |
| FR | 2648314 A1 * | 12/1990 | | |
| FR | 2730382 A1 * | 8/1996 | | |
| GB | 11740 A1 * | 5/1898 | | 43/81 |
| GB | 2141914 A1 * | 1/1985 | | |
| GB | 2216764 A1 * | 10/1989 | | 43/81 |
| GB | 2332356 A1 * | 6/1999 | | |
| WO | WO-85/05007 A1 * | 11/1985 | | 43/81 |
| WO | WO-90/04920 A1 * | 5/1990 | | |
| WO | WO-93/06722 A1 * | 4/1993 | | |
| WO | WO-94/12026 A1 * | 6/1994 | | |
| WO | WO-97/00607 A1 * | 1/1997 | | |

* cited by examiner

ANIMAL TRAP

This application claims the priority to and the benefit of U.S. Provisional Application Ser. No. 60/461,315 filed Apr. 8, 2003.

BACKGROUND OF THE INVENTION

The present invention relates to an animal trap. More particularly, the invention relates to an animal trap that is suited for destroying an animal, such as a mole, in its burrow, tunnel or run.

Moles can destroy a lawn or garden. While hunting for food such as insects or worms, moles can burrow tunnels beneath the surface, creating elaborate underground labyrinths that can ruin a lawn. Moles can get up to eight inches long. For example, the Eastern mole ranges in size from 5½ to 8 inches long and the Starnose mole measures from 4 to 5 inches long. People have tried many things to rid their lawn of moles including chemicals, gum, ground glass, noisemakers, Alka-Selter® and water to name a few.

Traps for destroying small animals, and especially moles, are well known in the art. Some of these traps are adapted to be placed inside the rodent's tunnel. One such conventional spring-loaded trap, as disclosed in U.S. Pat. No. 882,755, includes a box-shaped housing to which a wire frame is mounted above a top wall of the housing. A coil spring is mounted on the wire frame, so that when the trap is tripped the coil spring biases the wire frame upward. A loop depends downwardly from the frame inside the box-shaped housing. As a rodent enters the trap, it sets a trigger that releases the wire frame causing it to move upwardly. Since the loop depends from the wire frame, as the wire frame moves upwardly, so does the loop, thus catching the rodent between the top wall of the box-shaped housing and the loop.

The animal trap disclosed in the above-mentioned patent, requires any soil that has been placed on top of the either the wire frame, or the loop depending from it, to be displaced upon the tripping of the trap. Therefore, if the soil on top of the box-shaped housing becomes packed down, for example because of rain, the wire frame can be hindered in its upward movement. This may keep the trap from fulfilling its function. Also, since the housing does not have a bottom wall, a rodent can simply dig downwardly in its run and avoid the trap altogether.

Of course, many other types of rodent traps, from pincer types to one way tunnels are also known. However, each of these has its own disadvantages. Many protrude from the ground making them hazardous to passersby. Some are not very stable and are prone to shifting in the ground. The known animal traps also must work through the soil to trap or kill the animal. For example, pincer-type traps must cut through the soil on top of the animal's burrow in order to catch the animal. The trap disclosed in U.S. Pat. No. 882,755 must also displace soil before the animal can be trapped. Since soil must be displaced for the trap to serve its intended function, any spring that is used in the trap must have a high tension to store the amount of potential energy needed to move the portion of the trap, such as the pincers or the frame, through the soil. A high-tensioned spring requires a greater force to trip, and accordingly smaller animal, such as the Starnose mole, may not trip the known traps.

In addition to trapping moles, gardeners and others may also want to trap other small animals that can damage their lawn or garden. For example, squirrels, chipmunks, moles, shrews and the like can also damage a garden.

Accordingly, a need exists for an animal trap that overcomes the aforementioned difficulties and others. It would be advantageous to provide an animal trap where the moving parts would not have to travel through soil in order to trip the trap. It would be advantageous to mount all working parts of a trap inside a housing. It would be also advantageous to provide a floor for the trap.

SUMMARY OF THE INVENTION

An animal trap includes a frame, a striker, a biasing member, a set lever and a trigger. The frame includes an upper wall, a first side member depending from the upper wall and a second side member spaced from the first side member and depending from the upper wall. The striker mounts to at least one of the upper wall, the first side member and the second side member. The biasing member biases the striker away from the upper wall toward a direction that the side members depend from the upper wall. The set lever retains the striker toward the upper wall. The trigger operatively connects to the striker via the set lever. Movement of the trigger a predetermined distance results in movement of the trigger.

A method for setting a trap in an animal's run includes positioning a trap along the animal's run. The trap includes a housing having an entry opening, an upper wall, a striker biased toward a floor of the run, a set lever for setting the striker and a trigger for tripping the striker. The method further includes retaining the striker towards the upper wall with the set lever and positioning the trigger in the path of the animal's run.

An apparatus for trapping animals in the animal's burrow includes a housing having an entry opening through which an animal can enter the housing. A striker mounts inside the housing. A biasing member attaches to the striker inside the housing. A set lever mounts inside the housing. A trigger mounts inside the housing, wherein the trigger selectively contacts the set lever.

DETAILED DESCRIPTION OF THE INVENTION

Figure 1:
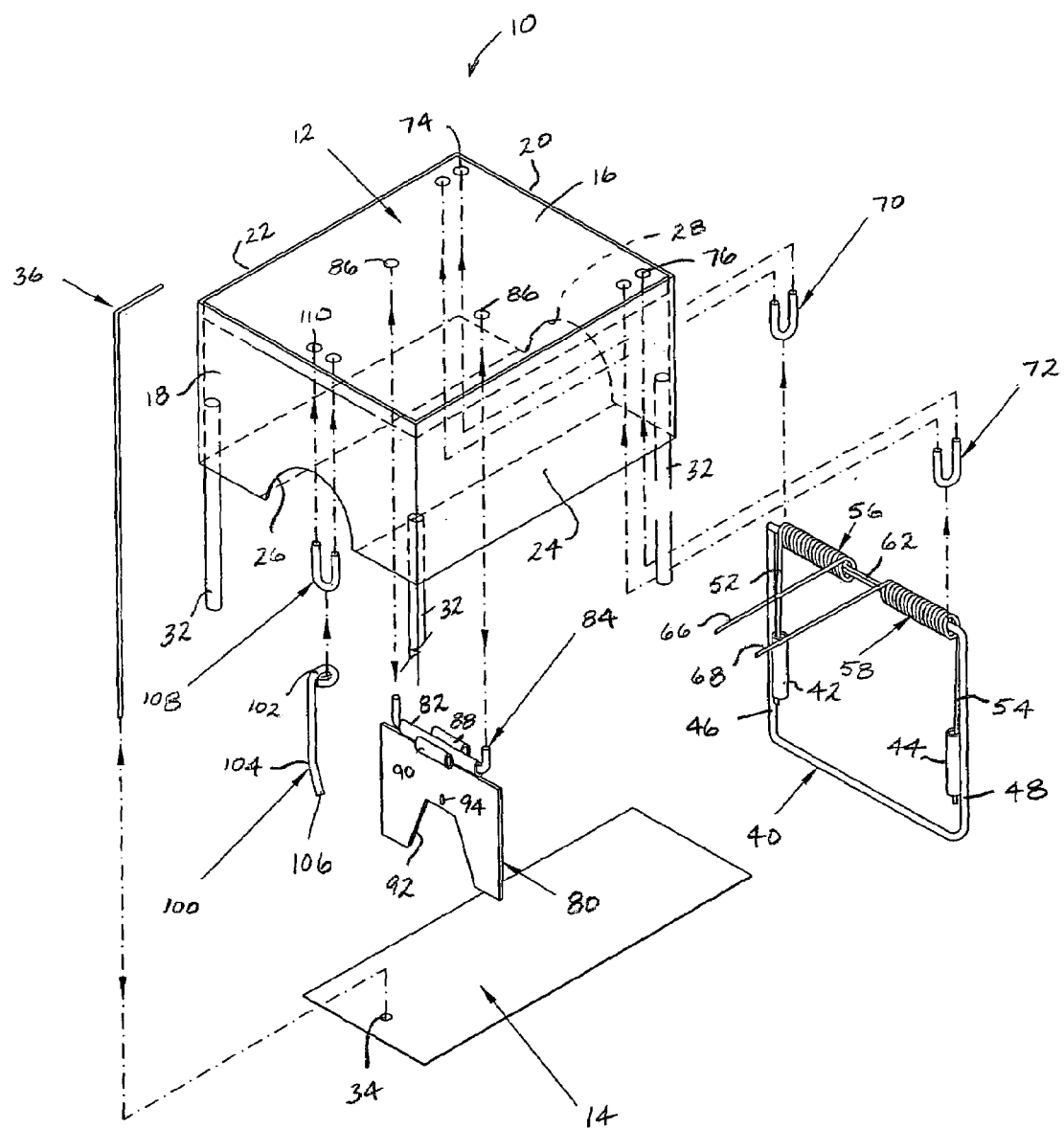
FIG. 1 is an exploded perspective view of the animal trap according to a first embodiment of the present invention.

Reference will now be made in detail to a preferred embodiment of the invention. While the invention will be described in connection with this embodiment of the invention, it is understood that the invention is not to be limited the specific embodiment described in this written description or the appended drawings. The invention covers all alternatives, modifications and equivalents that are included within the scope of the appended claim(s).

An animal trap 10 includes a frame 12 and can include a barrier plate or floor 14. The frame and the barrier plate can be made of metal, plastic or another conventional durable material. The frame includes a top wall 16, a front wall 18, a rear wall 20 and a pair of side walls 22 and 24. In this particular embodiment, the front wall 18 can be referred to as an entry wall. The entry wall 18 includes an entry opening 26 through which the animal can enter the trap. The rear wall 20 can also include an opening 28 so that the animal can see that its tunnel or run has not been interrupted (as that would cause it to stop). The side walls 22 and 24 are spaced from one another and connect the entry wall 18 to the rear wall 20. Attached to each corner of the frame 12 are posts 32 that can be used to anchor the frame 12 into the ground and prevent its moving or shifting.

The barrier plate 14 can be placed below the frame 12. The barrier plate 14 rests on the floor of the rodent's tunnel, burrow or run when the rodent trap 10 is set. The barrier plate 14 can include a hole 34 through which a pin 36 can be received. The hole 34 and the pin 36 are aligned with respect to the frame 12, when the trap is set, such that when frame 12 is placed over the plate 14 the pin 36 is in front of the entry opening 26. This discourages the rodent from packing the entry opening 26 with soil, which can result in a non-functioning trap. The plate can be useful in preventing the rodent from tunneling under the trap.

A striker 40 mounts to the upper wall 16 of the frame 12. The striker, in this particular embodiment, is a wire frame bent into a substantially square shape. The striker 40 can include a pair of receivers 42 and 44 mounted to respective side members or legs 46 and 48 of the striker. Each receiver 42 and 44 can be a hollow cylindrical member that receives a respective first leg 52 and 54 of a corresponding biasing member 56 and 58. In an alternate embodiment, the first legs 52 and 54 can wrap around the side members 46 and 48 or connect to the side members in any conventional manner, thus obviating the need for receivers 42 and 44.

Figure 2:
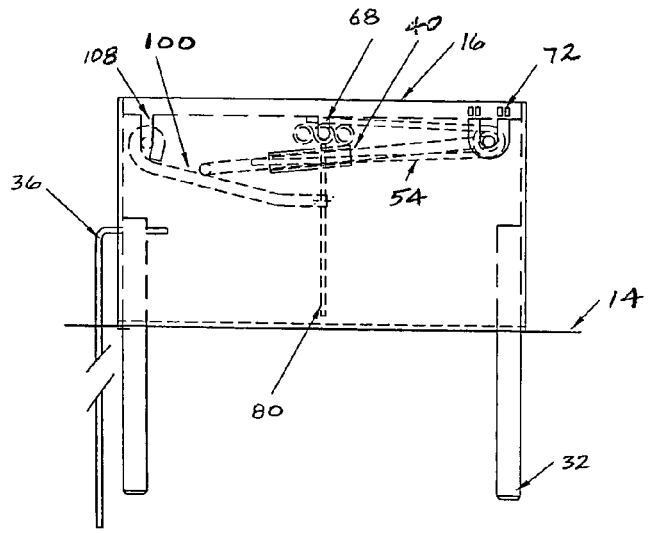
FIG. 2 is a side elevational view of the animal trap of FIG. 1 shown in a set position.

The biasing members, which in this particular embodiment are coil springs 56 and 58, are mounted to an attachment member or upper bar 62 of the striker 40. Each coil spring 56 and 58 also includes a second leg 66 and 68. When mounted on the upper bar 62 of the striker 40, each coil spring surrounds the upper bar 62 having its first leg 52 and 54 project along the side member 46 and 48 and received by the receiver 42 and 44 and the second extensions or legs 66 and 68 project substantially perpendicular to the first legs. As best seen in FIG. 2, with the striker 40 mounted to the top wall 16 of the frame 12, the second legs (only 68 being visible) abut against the top wall 16.

With reference again to FIG. 1, a pair of mounts 70 and 72, pivotally mount the striker 40 to the upper wall 16 of the frame 12. A first mount 70 can mount near the first spring 56 and a second mount 72 can mount near the second spring 58. The mounts can have a U-shape configuration, such that they receive the upper member 62 of the striker 40, so that the striker 40 can rotate about the upper member 62. A pair of openings 74 in the upper wall 16 receive the first mount 70 and a pair of openings 76 in the upper wall 16 receive the second mount 72.

In addition to the striker 40, a trigger plate 80 pivotally mounts to the upper wall 16. The trigger plate 80 includes a sleeve 82, which in this embodiment is a cylindrically shaped member that receives a trigger plate mounting rod 84. The trigger plate mounting rod is substantially U-shaped and can be received by a pair of openings 86 in the top plate 16. Also included on the trigger plate 80, a first cylinder 88 can mount to a first side of the sleeve 82 and a second cylinder 90 can mount to a second side of the sleeve 82.

The trigger plate 80 is substantially rectangular and has an isosceles trapezoidal opening 92 centered on its bottom edge. The exact shape of the opening is not limited. However, the size of the opening 92 should be such that the head of a small animal can stick through the opening 92, but a portion of the animal's body should contact the trigger plate 80. Also, the opening 92 in the trigger plate 80 can be larger than the entry opening 26 and exit opening 28 so that the animal's run appears uninterrupted. Positioned above the opening 92 is a hole 94, which receives an end of a set lever pin 100 to set the trap.

Figure 3:
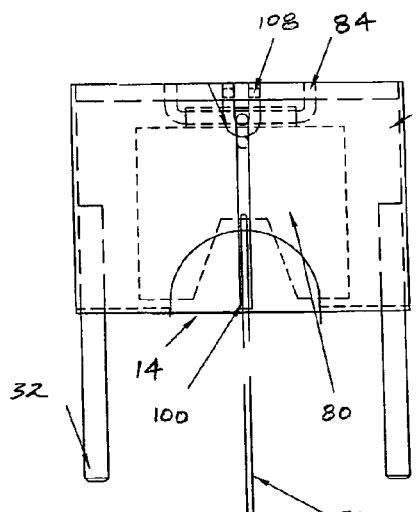
FIG. 3 is an end elevational view of the animal trap of FIG. 2.
Figure 4:
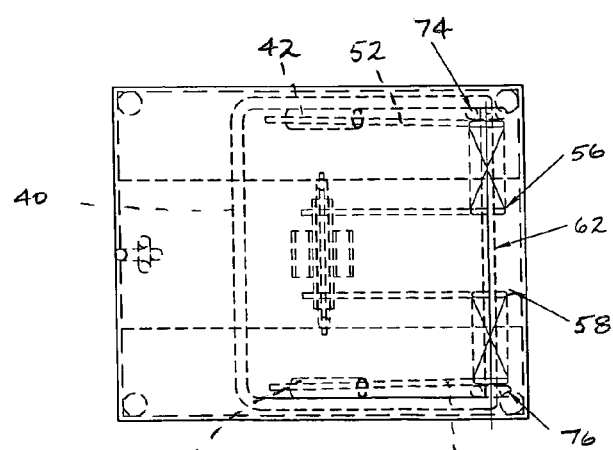
FIG. 4 is a top plan view of the animal trap of FIG. 1 shown in a set position.

The set lever pin 100 retains the striker 40 in a set position. The set lever pin 100 includes a loop 102 at a first end and a bend 104 near a second end 106. The bend 104 is angled so that the portion of the set lever pin 100 between the bend 104 and the end that contacts the trigger plate 80 is substantially horizontal when the trap is set, as seen in FIG. 2. This configuration advantageously minimizes the force required to trip the striker 40. Via a mount 108, the set lever pin 100 attaches to the upper wall 16 of the frame 12. The mount 108, which is similarly shaped to the mount 70 and 72, is received in the loop 102. A pair of openings 110 in the upper wall 16 can receive the mount 108. The second end 106 of the set lever pin 100 is received in the hole 94 to set the trap, which will be described in more detail with reference to FIGS. 2–4.

Figure 5:
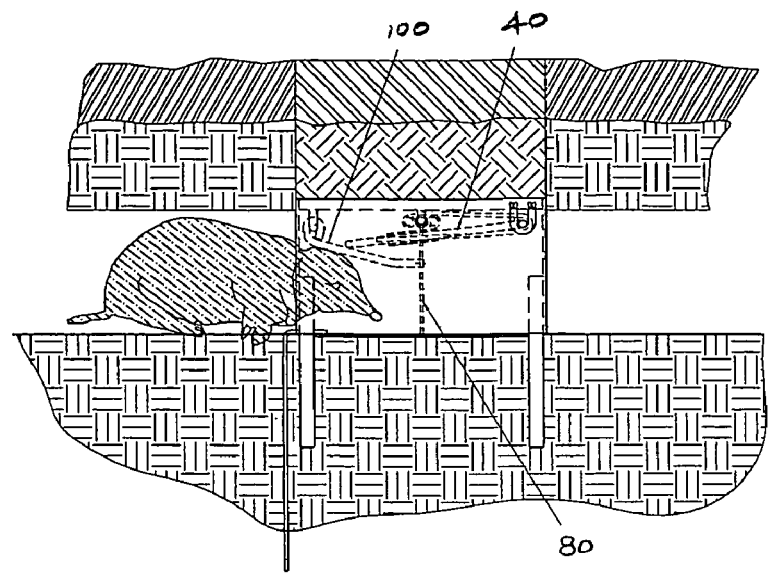
FIG. 5 is a side elevational view of the animal trap of FIG. 1, with an animal entering the set trap; and, FIG. 6 is a side elevational view of the animal trap of FIG. 5, with the trap having been tripped by the animal.
Figure 6:
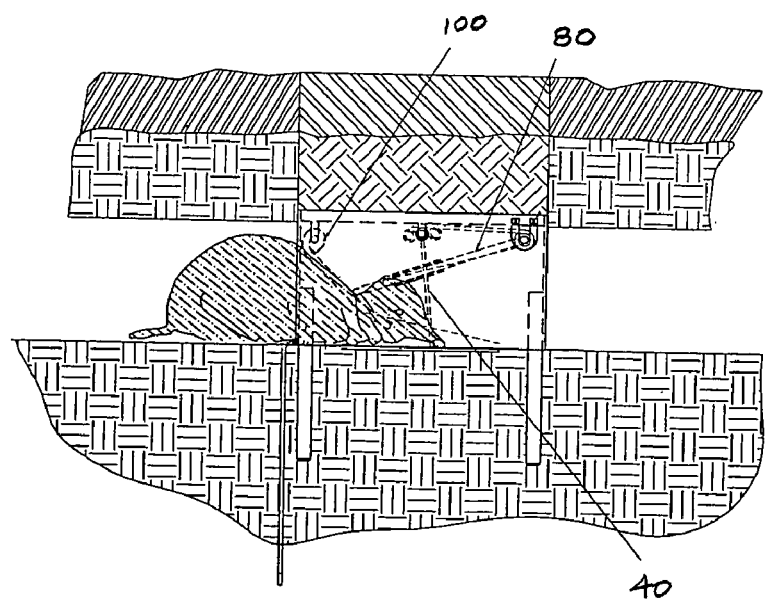

To set the trap 10, rotate the striker 40 toward and around the trigger plate 80 toward the upper wall 16. As is apparent, the striker 40 in this embodiment is dimensioned such that it can fit around the trigger plate 80. Place the set lever pin 100 underneath the striker 40 and place the second end 106 of the pin 100 into the hole 94 in the trigger plate 80. With reference to FIGS. 5 and 6, a rodent trips the trap 10 by moving the trigger plate 80 which releases the set lever pin 100, which releases the striker 40.

Although the invention has been described with respect to one embodiment with a certain degree of particularity, it will be understood that the present disclosure of this embodiment has been made only by way of example and that various changes may be resorted to without departing from the true spirit and scope of the invention. For example, a trap having only one entrance has been described, however, another entrance could be made on an opposite side of the trap, especially a trap having similar components on each side in a sort of mirrored relationship to one another.

The invention has been described with reference to the preferred embodiments. Obviously, modifications and alterations will occur to others upon reading and understanding the preceding detailed description. It is intended that the invention be construed as including all such modifications and alterations in so far as they come within the scope of the appended claim.

The invention claimed is:

1. An animal trap for trapping an animal in the animal's burrow, the trap comprising:
   a frame having an upper wall and at least two side walls depending there from, a first opening in a first wall of said at least two side walls through which an associated animal can enter and a second opening in a second side wall of said at least two side walls, spaced from the first opening through which the associated animal can see so that its burrow appears uninterrupted;
   a striker mounted inside the frame such that no portion of the striker extends beyond an exterior surface of the frame;
   a biasing member for biasing the striker away from the upper wall;

a set lever for retaining the striker adjacent the upper wall, said set lever comprises a pin;

a trigger operatively connected to the striker via the set lever and connected to the frame, wherein a movement of the trigger by a predetermined distance results in movement of the striker, and wherein the trigger is positioned in a manner such that the animal's burrow appears uninterrupted between the first opening and the second opening, wherein said set lever includes a first end pivotally mounted to the upper wall and a second end selectively contacting the trigger; and a floor spaced from the frame upper wall and extending from adjacent the first opening to adjacent the second opening such that a length of the floor is more than half the distance between the first opening and the second opening, wherein no components extend upwardly from the floor generally along a line that intersects the first opening and the second opening such that the animal's burrow appears uninterrupted between the first opening and the second opening.

2. The trap of claim 1, wherein the trigger comprises a trigger plate pivotally mounted to the upper wall.

3. The trap of claim 2, wherein the striker comprises a wire frame dimensioned to fit around the trigger plate.

4. The trap of claim 2, wherein the trigger plate includes an opening dimensioned to receive the head of a small animal.

5. The trap of claim 4, wherein the opening in the trigger plate comprises a notch removed from a bottom portion of the trigger plate.

6. The trap of claim 1, wherein the floor includes an aperture aligned with said first opening in said first wall of said at least two side walls.

7. The trap of claim 6, further comprising a pin received in the aperture, the pin being located adjacent said first opening in said first wall of said at least two side walls.

8. An animal trap for trapping an animal in it's burrow, comprising:
a quadrilateral frame comprising:
a top wall,
a first end wall including an aperture,
a second end wall including an aperture,
a first side wall,
a second side wall, and
a post connected to at least one of said walls for mounting the frame in soil adjacent the animal's burrow;
a bottom wall over which said frame is fitted to form an enclosed trap area in the animal's burrow;
a pin for mounting the bottom wall in the soil adjacent the animal's burrow;

a striker pivotally connected to said top wall;
a biasing member for biasing the striker away from said top wall;
a set lever for retaining the striker adjacent said top wall; and
a trigger operatively connected to the striker via the set lever and pivotally connected to the frame, wherein a movement of the trigger by a predetermined distance results in movement of the striker.

9. The trap of claim 8, wherein the trigger comprises a plate having an opening.

10. The trap of claim 8, wherein the set lever selectively contacts the striker inside the housing.

11. The trap of claim 8, wherein said post further comprises four posts, one on each corner of said quadrilateral frame.

12. The trap of claim 8, wherein said bottom wall is narrower than said top wall.

13. The trap of claim 8, wherein said bottom wall is longer than said top wall.

14. The trap of claim 8, wherein said bottom wall further comprises a first bottom wall section adjacent said first end wall and a second bottom wall section adjacent said second end wall.

15. A method for setting a trap in an animal's underground run comprising:
positioning a trap along the animal's run, wherein the trap includes a housing having an entry opening, a second opening aligned with the entry opening, an upper wall, a striker biased toward a floor of the run, a set lever for setting the striker and a trigger for tripping the striker, the set lever including a first end pivotally mounted to the upper wall and a second end selectively contacting the trigger;
retaining the striker towards the upper wall with the set lever;
positioning the trigger in the path of the animal's run such that the animal's run appears uninterrupted between the entry opening and the second opening;
positioning a floor plate below the upper wall, said floor plate including a floor plate opening disposed adjacent said entry opening; and
inserting a pin into said floor plate opening such that said pin extends upwardly from said floor plate.

16. The method of claim 15, wherein the step of retaining further comprises positioning the set lever underneath the striker and contacting the trigger.

17. The method of claim 15, wherein the step of retaining the striker includes passing a portion of the striker to a side of the trigger.

* * * * *